(12) United States Patent
Kaishio et al.

(10) Patent No.: US 6,186,561 B1
(45) Date of Patent: Feb. 13, 2001

(54) RETAINER FOR PIPING CONNECTOR

(75) Inventors: Mitsuo Kaishio; Masao Ueno, both of Koga (JP)

(73) Assignee: Sanoh Kogyo Kabushiki Kaisha, Ibaraki-ken (JP)

( * ) Notice: Under 35 U.S.C. 154(b), the term of this patent shall be extended for 0 days.

(21) Appl. No.: 09/141,435

(22) Filed: Aug. 27, 1998

(51) Int. Cl.[7] .................................................. F16L 37/00
(52) U.S. Cl. ........................... 285/319; 285/320; 285/308
(58) Field of Search ................................... 285/319, 320, 285/308

(56) References Cited

U.S. PATENT DOCUMENTS

| | | | |
|---|---|---|---|
| 4,946,205 | * 8/1990 | Washizu | 285/319 |
| 5,131,691 | * 7/1992 | Washizu | 285/319 |
| 5,161,832 | 11/1992 | McNaughton et al. | 285/319 |
| 5,161,833 | 11/1992 | McNaughton et al. | 285/319 |
| 5,297,818 | 3/1994 | Klinger | 285/93 |
| 5,324,082 | * 6/1994 | McNaughton et al. | 285/319 |
| 5,413,387 | * 5/1995 | Bartholomew | 285/319 |
| 5,415,825 | * 5/1995 | Sellers | 285/319 |
| 5,496,074 | * 3/1996 | Viratelle et al. | 285/320 |
| 5,511,827 | * 4/1996 | Steinkamp et al. | 285/308 |
| 5,568,946 | * 10/1996 | Jackowski | 285/319 |
| 5,897,142 | * 4/1999 | Kulevsky | 285/320 |

FOREIGN PATENT DOCUMENTS

| | | | |
|---|---|---|---|
| 538964 | * 8/1941 | (GB) | 285/320 |
| 5196184 | 8/1993 | (JP) . | |
| 5240387 | 9/1993 | (JP) . | |
| 5280680 | 10/1993 | (JP) . | |
| 405-272680 | * 10/1993 | (JP) | 285/319 |
| 6137477 | 5/1994 | (JP) . | |
| 771673 | 3/1995 | (JP) . | |
| 93/14341 | * 7/1993 | (WO) | 285/319 |

OTHER PUBLICATIONS

Patent Abstracts of Japan of 771673 dated Mar. 17, 1995.
Patent Abstracts of Japan of 6137477 dated May 17, 1994.

* cited by examiner

*Primary Examiner*—Eric K. Nicholson
(74) *Attorney, Agent, or Firm*—Ladas and Parry

(57) ABSTRACT

The present invention provides a retainer for a pipe connecting device, capable of being disengaged from a pipe without using any special disconnecting tool when disconnecting the pipe from the connector housing, and of remaining on a connector housing without being separated together with the pipe from the connector housing when the pipe is disconnected from the connector.

A retainer (17) of an elastic material is interposed between a pipe (14) and a connector housing (15) in a known manner. When the pipe connecting device is in a connecting state, first catching edges (26a) of a pair of flexible catching parts (26) formed in a middle part of the retainer (17) are in engagement with a stopping protrusion (18) formed on the pipe (14), second catching parts (26b) lie in openings (20) formed in the connector housing (15) and are in engagement with support bars (19). Parts near the pair of second catching edges (26b) are connected integrally by fixed walls (28) serving as a spacing means. When operating knobs (25) formed opposite to each other on one end of the retainer (17) are pressed toward each other by fingers, parts near the pair of second catching edges (26b) serve as fixed fulcra, the first catching edges (26a) on one side of the flexible catching parts (26) opposite the side of the operating knobs (25) are displaced outward and are disengaged from the stopping protrusion (18) of the pipe (14). Then, the pipe (14) can be disconnected from the connector housing (15), and the retainer (17) remains on the connector housing (15).

8 Claims, 8 Drawing Sheets

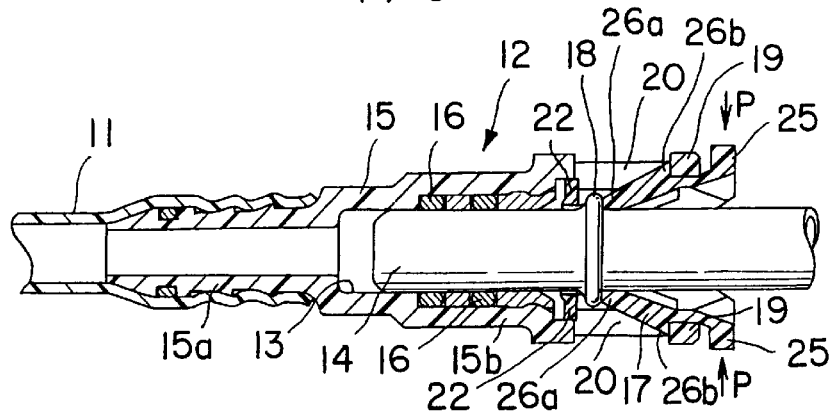
F I G. 1
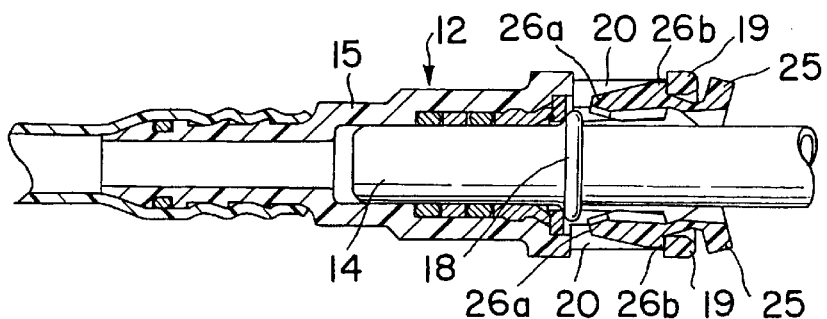
F I G. 2
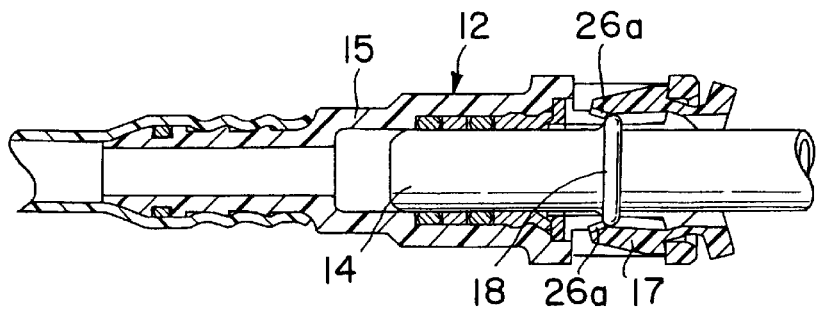
F I G. 3
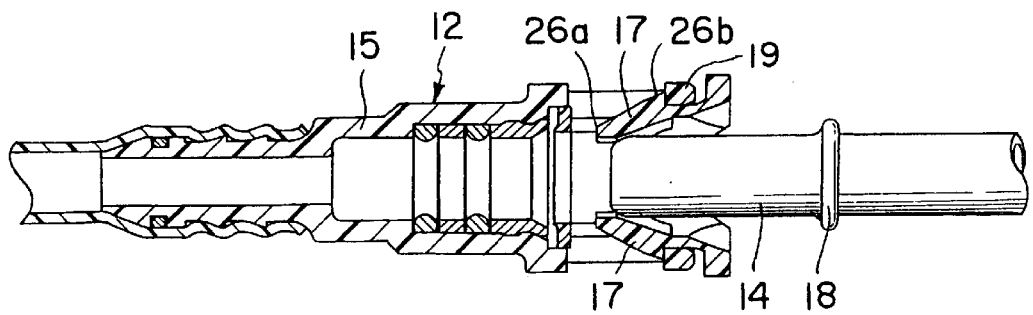
F I G. 4

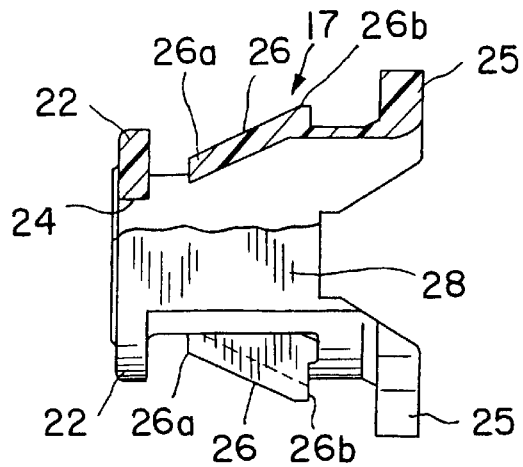
F I G. 5
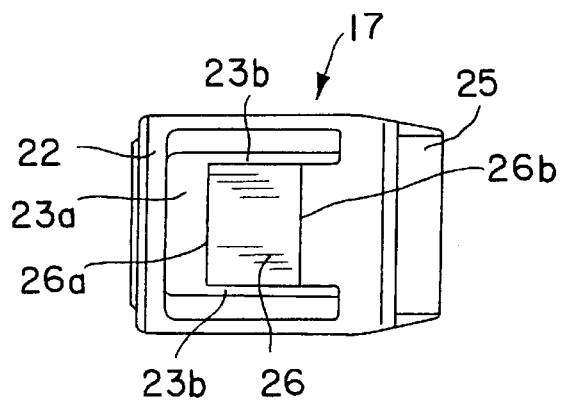
F I G. 6
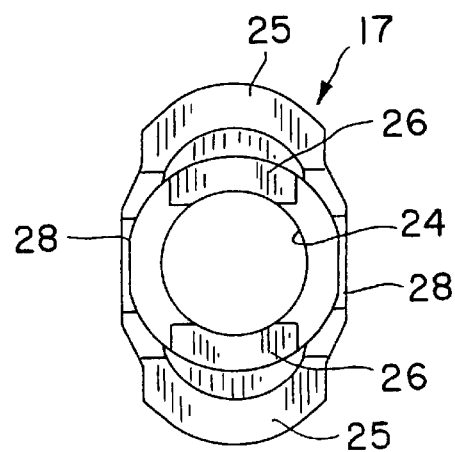
F I G. 7

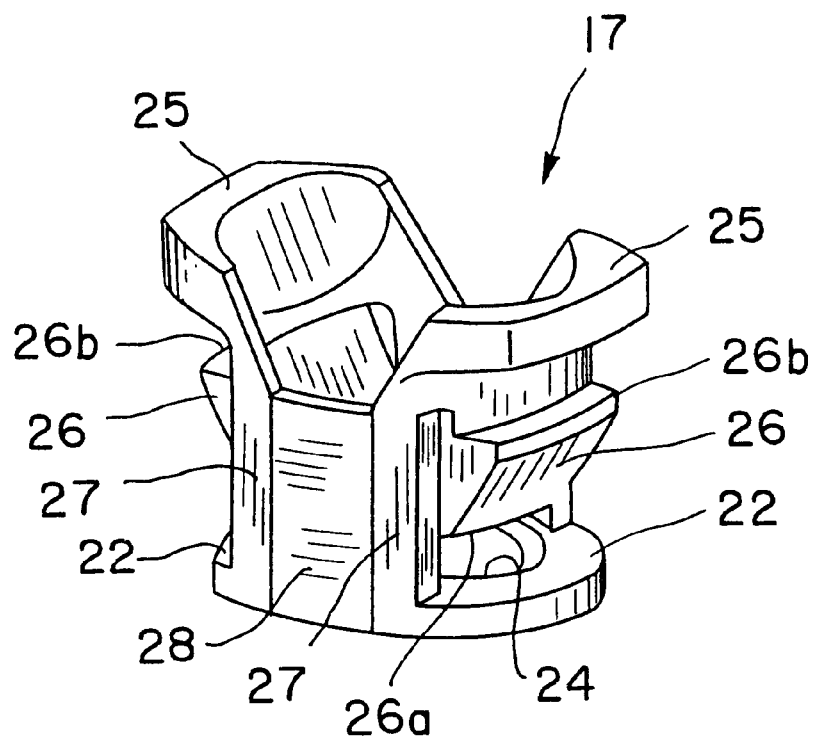
F I G. 8
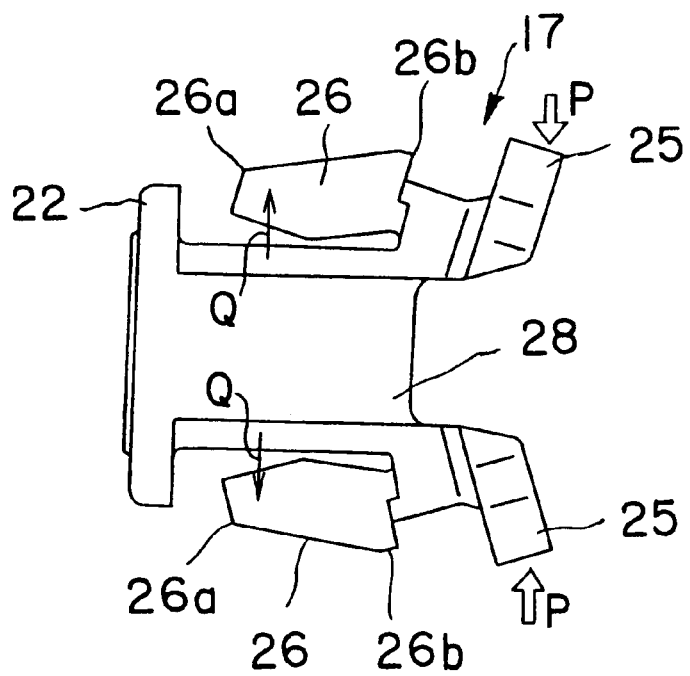
F I G. 9

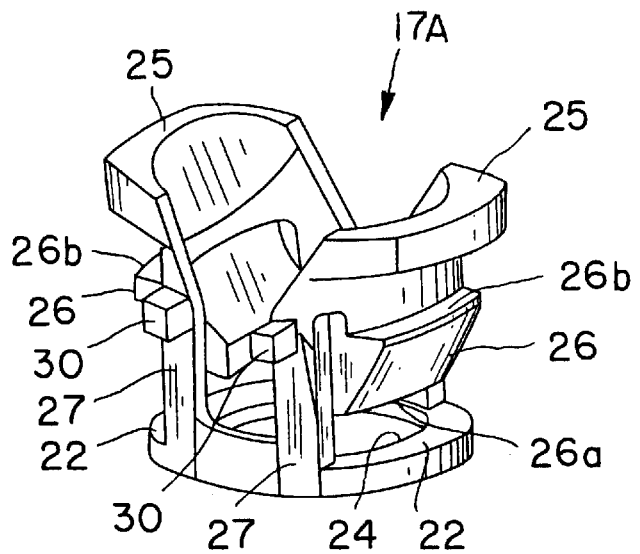
F I G. 10
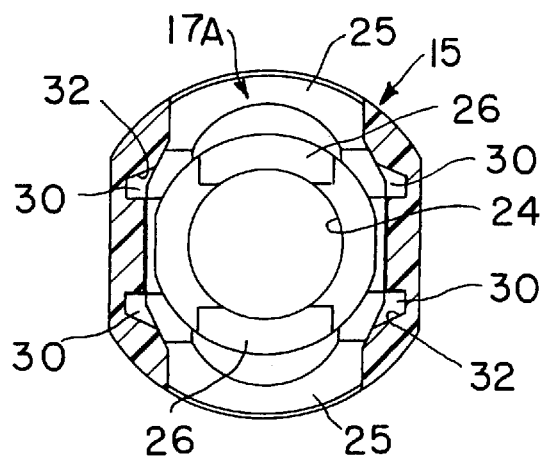
F I G. 11
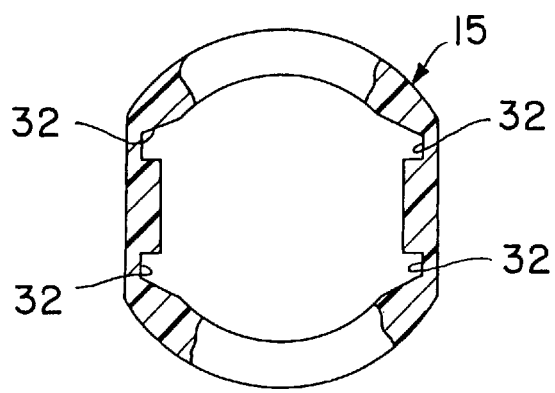
F I G. 12

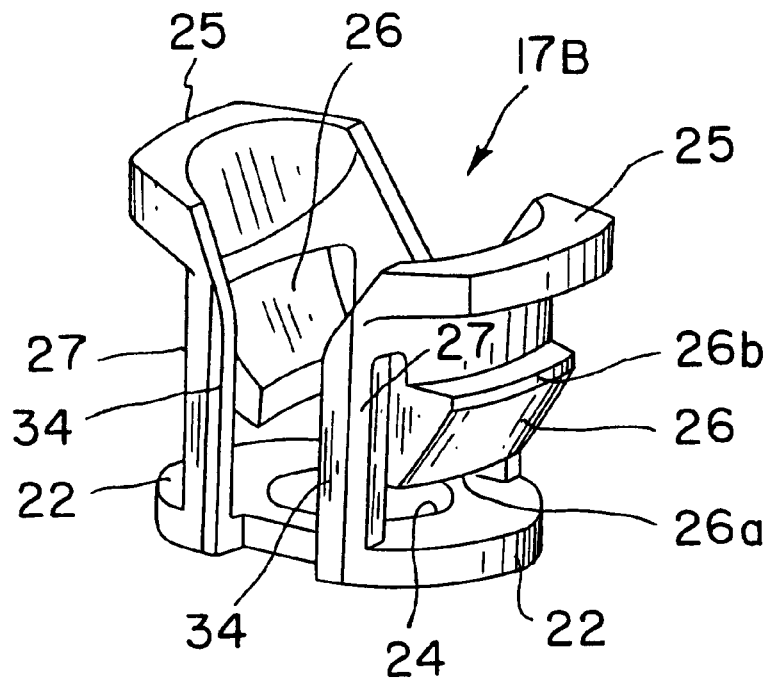
F I G. 13
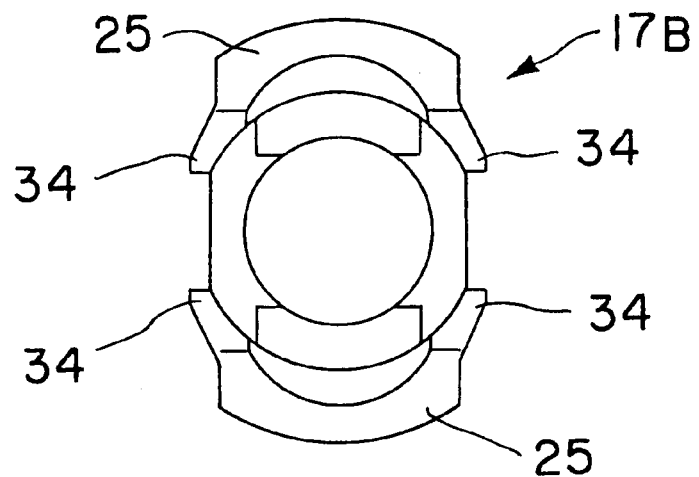
F I G. 14

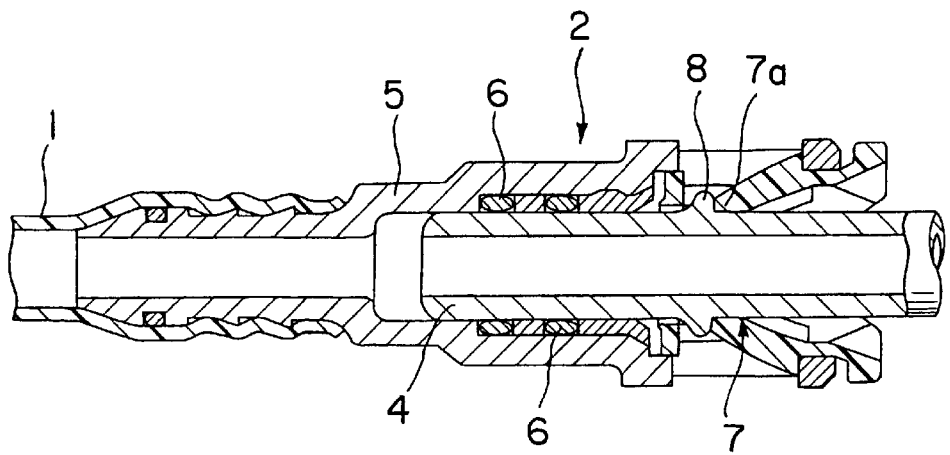
F I G. 17
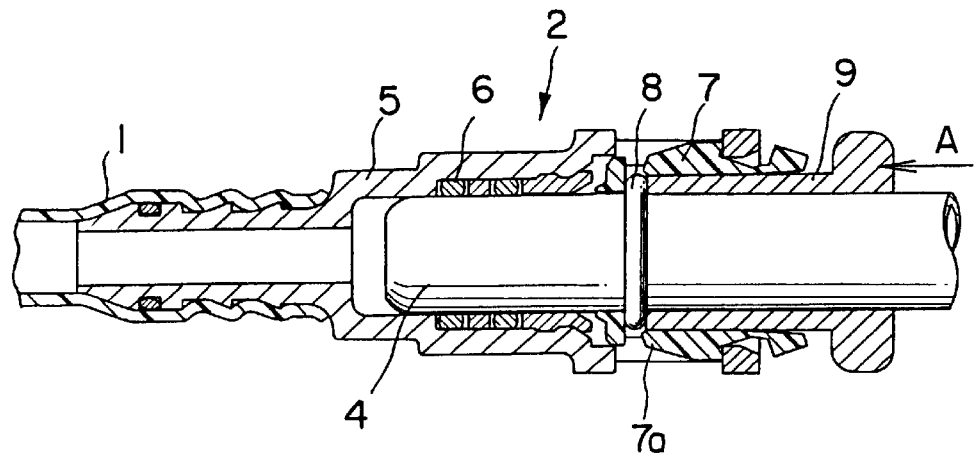
F I G. 18
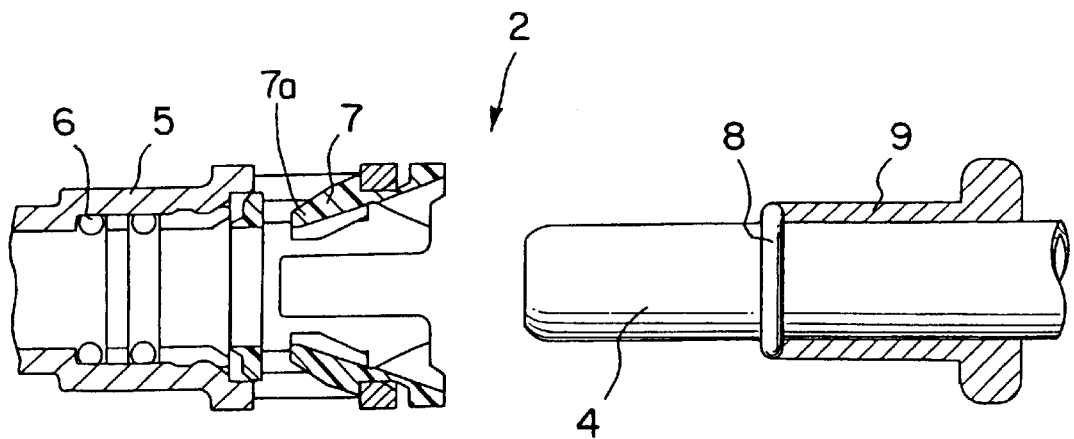
F I G. 19

US 6,186,561 B1

1

RETAINER FOR PIPING CONNECTOR

BACKGROUND OF THE INVENTION

1. Field of the Invention

The present invention relates to a retainer for a pipe connecting device to be used in, for example, an automotive fuel pipeline. The pipe connecting device is used in, for example, an automotive fuel pipeline to connect a pipe to a fuel filter and to connect a pipe to a fuel pump unit.

2. Description of the Related Art

An automotive fuel pipeline employs, for example, a connector 2 as shown in FIG. 17. A tubular connector housing 5 has a first end part fitted on a pipe 4, and a second end part fitted in a synthetic resin tube 1. A space between the inner circumference of the first end part of the connector housing 5 and the outer circumference of the pipe 4 is stuffed with O rings 6 for sealing. A retainer 7 provided with teeth 7a formed so as to bend elastically radially inward is attached to the connector housing 5 to fasten the connector housing 5 to the pipe 4. When the pipe 4 is pushed into the connector housing 5, the teeth 7a engage with a stopping protrusion 8 to restrain the connector housing 5 from separating from the pipe 4.

When the connector housing 5 is connected to the pipe 4 by this conventional pipe connecting device, the connector housing 5 cannot be separated from the pipe 4 unless the teeth 7a are disengaged from the stopping protrusion 8. Therefore, when disconnecting the pipe 4 from the connector housing 5, a tubular tool 9 is put on the pipe 4 as shown in FIG. 18, the tool 9 is moved in the direction of the arrow A to warp the teeth 7a radially outward so that the teeth 7a may be disengaged from the stopping protrusion 8, and then the pipe 4 is disconnected from the connector housing 5 as shown in FIG. 19. Although it is convenient that the retainer 7 remains attached to the connector housing 5 after the pipe 4 has been disconnected from the connector housing 5 and hence the retainer 7 will not be lost, it is inconvenient that the pipe 4 cannot be disconnected from the connector housing 5 unless the special tool is used.

If the pipe 4 needs to be disconnected from the connector housing 5 without using the tool 9, a radial, compressive force is applied to an operating part 7c of the retainer 7 as indicated by the arrows B in FIG. 20 to sink the retainer 7 into an opening formed in the connector housing 5, and then the pipe 4 is disconnected from the connector housing 5 as shown in FIG. 21. In this case, the retainer 7 remains on the pipe 4 as shown in FIG. 21 and the same is liable to be lost.

SUMMARY OF THE INVENTION

Accordingly, it is an object of the present invention to provide a retainer for a pipe connecting device, capable of being disengaged from a pipe without using any special disconnecting tool when disconnecting the pipe from the connector housing, and of remaining on a connector housing without being separated together with the pipe from the connector housing when the pipe is disconnected from the connector.

According to a first aspect of the present invention, a retainer of an elastic material employed in a pipe connecting device comprising a pipe provided with a stopping protrusion in an outer circumference of a connecting end part thereof, and a connector housing having a first end part hermetically fitted on the connecting end part of the pipe and a second end part connected to a tube to be connected to the pipe, and interposed between the pipe and the connector

2 housing, has flexible stopping parts for preventing the disconnection of the pipe from the connector housing, disposed diametrically opposite to each other with respect to the pipe as fitted in the connector housing, and each having a first catching edge formed near the connector housing so as to engage with the stopping protrusion of the pipe, and a second catching edge formed apart from the connector housing so as to engage with the connector housing; in which the second catching edges are provided integrally with operating parts formed at positions diametrically opposite to each other, around the pipe and outside the first end part of the connector housing, a spacing means for inhibiting the change of the distance between the pair of second catching edges disposed diametrically opposite to each other is formed near the second catching edges, the spacing means comprises opposite walls integrally connecting parts of the pair of flexible stopping parts near the second catching edges on the opposite sides of the flexible stopping parts, and the flexible stopping parts are turned on parts near the second catching edges so that the first catching edges of the flexible stopping parts may be moved radially outward so as to be disengaged from the stopping protrusion of the pipe when the operating parts are pressed toward the pipe According to a second aspect of the present invention, a retainer of an elastic material employed in a pipe connecting device comprising a pipe provided with a stopping protrusion in an outer circumference of a connecting end part thereof, and a connector housing having a first end part hermetically fitted on the connecting end part of the pipe and a second end part connected to a tube to be connected to the pipe, and interposed between the pipe and the connector housing, has flexible stopping parts for preventing the disconnection of the pipe from the connector housing, disposed diametrically opposite to each other, and each having a first catching edge formed near the connector housing so as to engage with the stopping protrusion of the pipe, and a second catching edge formed apart from the connector housing so as to engage with the connector housing; in which the second catching edges are provided integrally with operating parts formed at positions diametrically opposite to each other, around the pipe and outside the first end part of the connector housing, a spacing means for inhibiting the change of the distance between the pair of second catching edges disposed diametrically opposite to each other is disposed near the second catching edges, the spacing means comprises projections projecting radially outward on the opposite sides of parts near the second catching edges of the pair of flexible stopping parts and engaging with the inner surface of the connector housing, and the flexible stopping parts are turned on parts near the second catching edges so that the first catching edges of the flexible stopping parts may be moved radially outward so as to be disengaged from the stopping protrusion of the pipe when the operating parts are pressed toward the pipe.

In the retainer for the pipe connecting device, according to the present invention, parts of the pair of opposite flexible stopping parts near the second catching edges on the base end side of the pair of flexible stopping parts are fixed to each other on the opposite sides of the flexible stopping parts or the projections projecting radially outward on the opposite sides of parts near the second catching edges are engaged with the inner surface of the connector housing to keep the distance between the second catching edges perfectly fixed. Therefore, the flexible stopping parts can be turned on the parts near the second catching edges serving as a perfectly stationary fulcra to displace the first catching edges radially outward by pressing the operating parts of the retainer by fingers. Accordingly, the first catching edges can surely be disengaged from the stopping protrusion of the pipe to disconnect the connector housing and the pipe of the pipe connecting device without using any tool, and the retainer can be kept on the connector housing.

Other features and advantages of the present invention will become more apparent from the following description taken in connection with the accompanying drawings.

BRIEF DESCRIPTION OF THE DRAWINGS

FIG. 1 is a sectional view of a pipe connecting device provided with a retainer in accordance with the present invention;

FIG. 2 is a sectional view of the pipe connecting device of FIG. 1 in a first step of a procedure for disconnecting a pipe from a connector housing;

FIG. 3 is a sectional view of the pipe connecting device of FIG. 1 in a second step of the procedure for disconnecting a pipe from a connector housing subsequent to the first step illustrated in FIG. 2;

FIG. 4 is a sectional view of the pipe connecting device of FIG. 1 in a state after the completion of disconnection of a pipe from a connector housing;

FIG. 5 is a partly sectional view of a retainer in a first embodiment according to the present invention;

FIG. 6 is a plan view of the retainer of FIG. 5;

FIG. 7 is a right end view of the retainer of FIG. 5;

FIG. 8 is a perspective view of the retainer of FIG. 5;

FIG. 9 is a sectional view of the retainer of FIG. 5 in a deformed state;

FIG. 10 is a perspective view of a retainer in a second embodiment according to the present invention;

FIG. 11 is a sectional view of the retainer of FIG. 10 as fitted in a connector housing;

FIG. 12 is a sectional view of a connector housing shown in FIG. 11;

FIG. 13 is a perspective view of a retainer in a third embodiment according to the present invention;

FIG. 14 is an end view of the retainer of FIG. 13;

FIG. 17 is a sectional view of a conventional connector;

FIG. 18 is a sectional view of the connector of FIG. 17 in a first step of disconnecting a pipe from the connector of FIG. 17 by using a tool;

FIG. 19 is a sectional view of the connector of FIG. 17 disconnected from a pipe;

DESCRIPTION OF THE PREFERRED EMBODIMENTS

Figure 15:
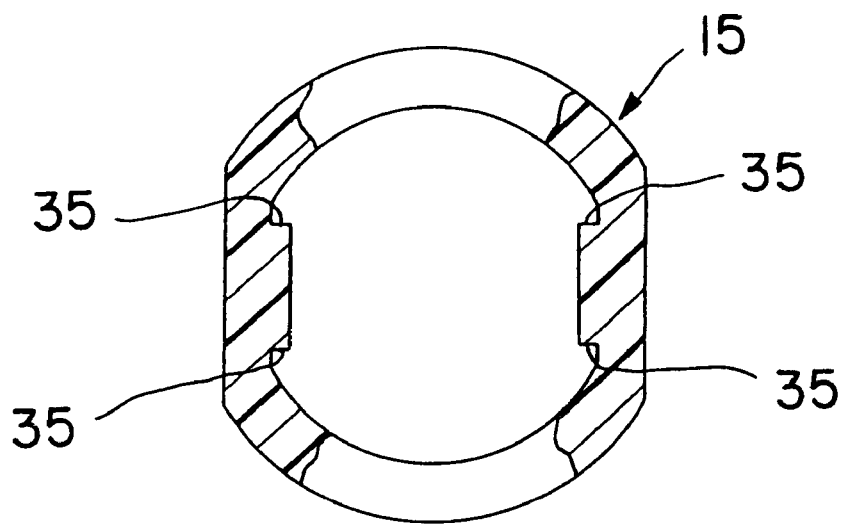
FIG. 15 is a sectional view of a connector housing in which the retainer of FIG. 14 is fitted.

Preferred embodiments of the p resent invention will be described with reference to the accompanying drawings.

Referring to FIG. 1, a pipe connecting device 12 comprises a pipe 14, a connect or housing 15, and a retainer 17 in accordance with the present invention. As is generally known, the pipe 14 is such as extending from an automotive fuel pump unit or a fuel filter. The free end part, i.e., a connecting end part, of the pipe 14 is provided in its outer circumference with, for example, an annular stopping protrusion 18.

The connector housing 15 has a generally cylindrical shape and is made of a synthetic resin, such as nylon, or a metal. The connector housing 15 has a tube connecting part 15a inserted into a synthetic resin tube 11 included in a fuel supply system of an automobile, and a pipe connecting part 15b. The connecting part 15a has an outer surface with a diameter increasing in steps toward the pipe connecting part 15b. The connector housing 15 is provided with an axial, stepped through hole 13 having a diameter increasing in steps toward the pipe connecting part 15b. O rings 16 are fitted in a part of the through hole 13 in the pipe connecting part 15b. The connector housing 15 is provided in a part near the free end of the pipe connecting part 15b with a pair of openings 20 formed diametrically opposite to each other. The openings 20 have, for example, a square shape. A retainer support bar 19 defines one end of each of the openings 20.

The retainer 17 in accordance with the present invention is made of a flexible synthetic resin in a construction shown in FIGS. 5 to 8. Basically, the retainer 17 has a cylindrical shape. As best shown in FIGS. 5 and 8, the retainer 17 has one end provided with flanges defining a bore 24, and the other end provided with operating knobs 25 in a diametrically opposite arrangement. The retainer 17 defines therein a space having a section in a plane including the operating knobs 25 expanding from the bore 24 toward the operating knobs 25. The operating knobs 25 project radially outward.

The retainer 17 is provided in its middle part with a pair of flexible catching parts 26 formed diametrically opposite to each other. As shown in FIG. 7, the opposite arrangement of the flexible catching parts 26 is the same as that of the operating knobs 25. Each of the flexible catching parts has a first catching edge 26a at one end thereof and a second catching edge 26b at the other end thereof. A part of each flexible catching part 26 on the side of the second catching edge 26b is continuous with the body of the retainer 17. The opposite circumferential sides and a part of the flexible catching part 26 on the side of the first edge 26a are separated from the body of the retainer 17 by spaces 23a and 23b as shown in FIG. 6. Thus, the flexible catching part 26 can elastically be warped so that a part of the flexible catching part 26 on the side of the first catching edge 26a is elastically displaced.

As best shown in FIG. 8, in each of diametrically opposite half parts of the retainer 17, the flange 22 and the operating knob 25 are connected integrally by connecting parts 27. The connecting parts 27 of one of the half parts and the corresponding connecting parts 27 of the other half part are connected integrally by fixed walls 28. Therefore, the distance between the connecting parts 27 of one of the half parts and the corresponding connecting parts 27 of the other half part is kept fixed by the fixed walls 28. The fixed walls 28 extend to positions near the second catching edges 26b of the flexible catching parts 26, so that the distance between the second catching edges 26b changes scarcely even if the retainer 17 is elastically deformed; that is, the second catching edges 26b cannot be moved toward each other even if a force is applied to the second catching edges 26b in an attempt to move the second catching edges 26b toward each other. Thus, the fixed walls 28 form a spacing means for inhibiting the change of the distance between the second catching edges 26b.

The retainer 17 of the foregoing construction is connected to the connector housing 15 as shown in FIG. 1. The second catching edges 26b of the flexible catching parts 26 are disposed in the openings 20 of the connector housing 15 so as to engage with the inner surfaces of the support bars 19, respectively. A part of each of the flexible catching parts 26 between the second catching edge 26b and the operating knob 25 extends along the inner surface of the support bar 19 and projects outside from the connector housing 15 so that the operating knob 25 lies adjacent to the outer surface of the support bar 19. In this state, the flanges 22 of the retainer 17 are positioned at the entrance of a sealing part containing the O rings 16 of the through hole 13 of the connector housing 15.

The pipe 14 is inserted in the connector housing 15 combined with the retainer 17 through the retainer 17. The stopping protrusion 18 of the pipe 14 advances past the first catching edges 26a into the through hole 13, elastically warping the flexible catching parts 26. Upon the passage of the catching protrusion 18 past the first catching edges 26a, the flexible catching parts 26 turn radially inward by their own elasticity and the first catching edges 26a engage with the catching protrusion 18 as shown in FIG. 1. In this state, the O ring 16 is in close contact with the outer circumference of an end part of the pipe 14 for sealing. The pipe 14 is kept in the connector housing 15 by the engagement of the first catching edges 26a and the stopping protrusion 18.

When disconnecting the pipe 14 thus connected to the connector housing 15 as shown in FIG. 1 from the connector housing 15, the operating knobs 25 projecting outside from the connector housing 15 are pressed by fingers of a user in the directions of the arrows P shown in FIG. 1 to deform the retainer 17 in a shape as shown in FIG. 9, in which the operating knobs 25 have been moved toward each other. However, the displacement of the operating knobs 25 does not affect the positions of the second catching edges 26b of the flexible catching parts 26 because the parts of the retainer 17 near the opposite sides of the pair of second catching edges 26b are connected integrally by the fixed walls 28. Since the positions of the second catching edges 26b are not affected by the displacement of the operating knobs 25, and the distance between the second catching edges 26b is fixed, the flexible catching parts 26 are turned on the parts near the second catching edges 26b, which serve as fulcrums, in the directions of the arrows Q shown in FIG. 9, respectively, and, consequently, the first catching edges 26a of the flexible catching parts 26 are displaced radially outward. During this operation for displacing the first catching edges 26a radially outward, the second catching edges 26b remain stationary and remain in contact with the support bars 19 of the connector housing 15. Accordingly, the retainer 17 does not come off the connector housing 15.

When the first catching edges 26a of the retainer 17 are thus displaced radially outward, the retainer 17 is deformed relative to the pipe 14 in a shape as shown in FIG. 2, in which the first catching edges 26a are disengaged from the stopping protrusion 18 of the pipe 14. When the connector housing 15 is pulled away from the pipe 14, the first catching edges 26a are able to move past the stopping protrusion 18 without being checked by the stopping protrusion 18 as shown in FIG. 3, and the connector housing 15 can be disconnected from the pipe 14 as shown in FIG. 4 without using any special tool. After the connector housing 15 has been disconnected from the pipe 14, the retainer 17 remains held on the connector housing 15 and hence the retainer 17 will not be lost. When connecting the connector housing 15 again to the pipe 14, it is necessary only to push the connector housing 15 holding the retainer 17 onto the pipe 14.

A retainer 17A in a second embodiment according to the present invention is shown in FIGS. 10 to 12, in which parts like or corresponding to those of the retainer 17 in the first embodiment are designated by the same reference characters and the description thereof will be omitted. The retainer 17A in the second embodiment differs from the retainer 17 only in a spacing means for inhibiting the change of the distance between second catching edges 26b. In the first embodiment, the connecting parts 27 are connected integrally by the fixed walls 28 so that the distance between the second catching edges 26b may not change. In the second embodiment, detaining projections 30, i.e., spacing means, project outward from parts of connecting parts 27 near second catching edges 26b as shown in FIG. 10. As shown in FIG. 12, a connector housing 15 is provided in its parts with recesses 32 at positions corresponding to the detaining projections 30 of the retainer 17A as put in place in the connector housing 15. When the retainer 17A is combined with the connector housing 15, the detaining projections 30 fit into the recesses 32 as shown in FIG. 11. Since the detaining projections 30 are held in the recesses 32 and restrained from movement, the displacement of the parts near the second catching edges 26b is inhibited by the detaining projections 30 and the parts near the second catching edges 26b do not move when operating knobs 25 are pressed toward each other. Consequently, first catching edges 26a, similarly to those of the first embodiment, are displaced outward and disengaged from the stopping protrusion 18 of the pipe 14.

Figure 16:
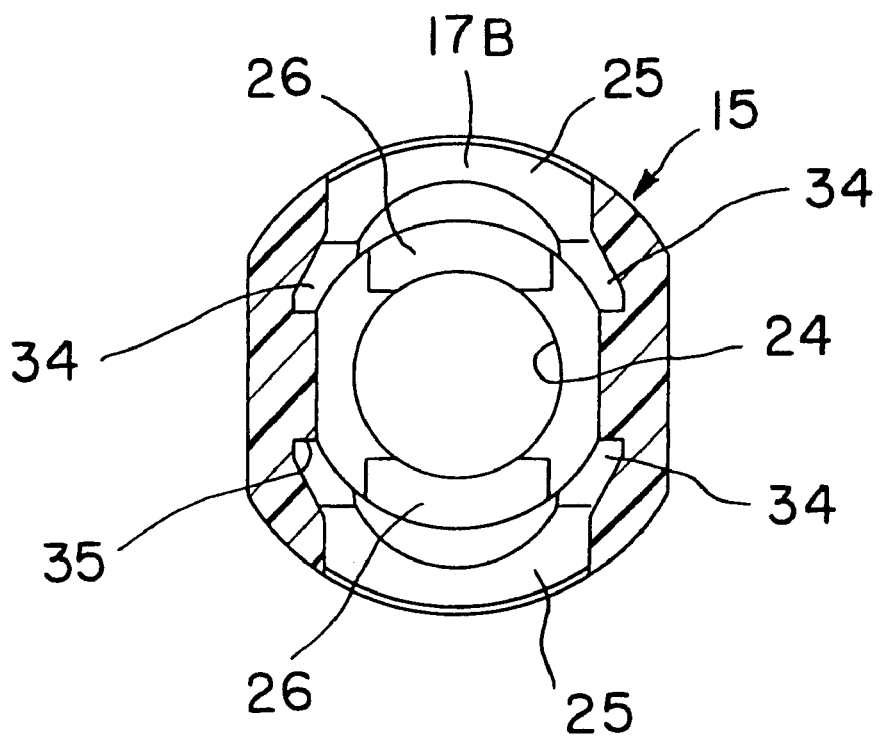
FIG. 16 is a sectional view of the connector housing of FIG. 15 in which the retainer of FIG. 14 is fitted.
Figure 20:
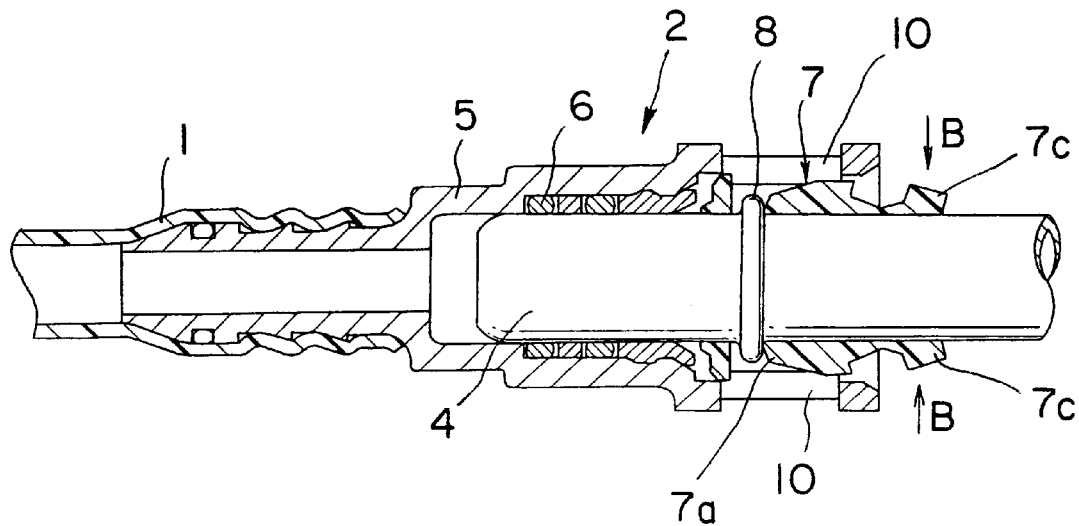
FIG. 20 is a sectional view of the connector of FIG. 17 in a first step of a disconnecting procedure for disconnecting a pipe from the connector of FIG. 17 without using any tool.
Figure 21:
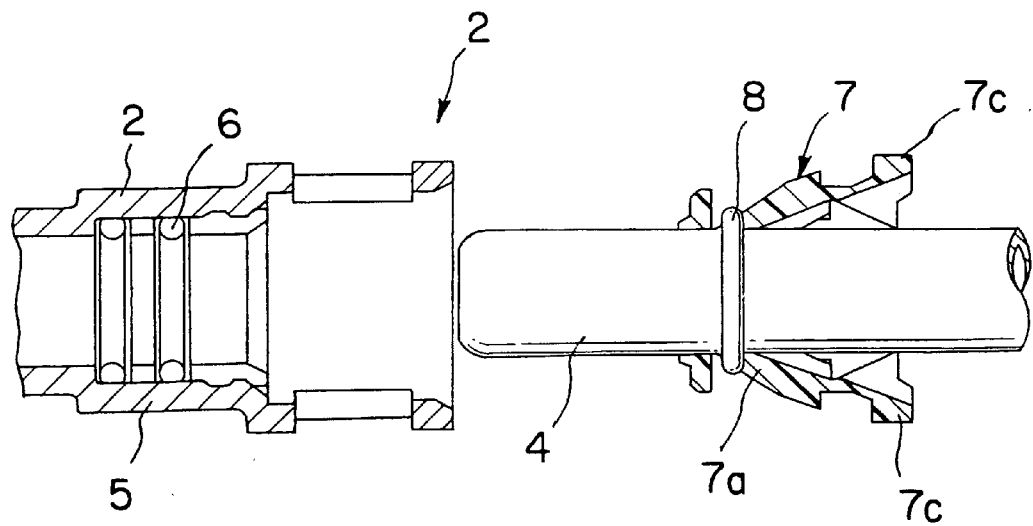
FIG. 21 is a sectional view of the connector of FIG. 17 disconnected from the pipe by the disconnecting procedure illustrated in FIG. 20.

A retainer 17B in a third embodiment according to the present invention is shown in FIGS. 13 to 16, in which parts like or corresponding to those of the retainer 17A in the second embodiment are designated by the same reference characters and the description thereof will be omitted. The retainer 17B in the third embodiment differs from the retainer 17A only in a spacing means for inhibiting the change of the distance between second catching edges 26b. Whereas the spacing means of the second embodiment for inhibiting the change of the distance between the second catching edges 26b comprises the local detaining projections 30 and the parts of the connector housing provided with the recesses 32 at positions corresponding to the detaining projections 30 as shown in FIG. 11, the third embodiment employs a spacing means comprising detaining ridges 34 formed on connecting parts 27 substantially over the entire length of the connecting parts 27, and parts of a connector housing 15 provided with grooves 35 capable of receiving the entire detaining ridges 34 and formed at positions corresponding to the ridges 34. The detaining ridges 34 project obliquely outward as shown in FIG. 14. Work for fitting the detaining ridges 34 in the grooves 35 when combining the retainer 17B in the third embodiment with the connector housing 15 is easier than that for fitting the detaining projections 30 in the recesses 32 when combining the retainer 17A in the second embodiment shown in FIG. 10. When fitting the detaining projections 30, the axial positions of the detaining projections 30 must be adjusted so as to coincide with the recesses 32. When fitting the detaining ridges 34 in the grooves 35, any consideration need not be given to the axial position of the detaining ridges 34 of the retainer 17B shown in FIG. 13.

What is claimed is:

1. A retainer of an elastic material employed in a pipe coupling for a pipe provided with a stopping protrusion on an outer circumference thereof and a connector housing for receiving said pipe, said retainer being interposed between said pipe and said connector housing for engagement with said pipe and said connector housing, said retainer comprising:

a pair of stopping parts disposed opposite each other with respect to a diametrical direction of said retainer, each of said stopping parts having a forward catching edge for engaging said stopping protrusion of said pipe and a rearward catching edge for engaging said connector housing, each of said forward catching edges being pivotable about a pivotal axis extending in a direction perpendicular to said diametrical direction and perpendicular to an axial direction of said retainer;

a pair of operating parts connected to rear end portions of said stopping parts respectively for producing pivotal movement of said stopping parts; and means for positioning each said pivotal axis of said stopping parts to a position adjacent to a radial plane including the rearward catching edges of said stopping parts, and for fixing a distance between said pivotal axes of said stopping parts with respect to said diametrical direction of said retainer, said operation parts being displaceable toward said pipe to cause said forward catching edges of said stopping parts to be moved radially outward so as to be disengaged from said stopping protrusion of said pipe while said rearward catching edges of said stopping parts are kept engaged with said connector housing, each of said operating parts having side end portions opposite each other with respect to said direction of said pivotal axis of said stopping parts, said retainer further comprising:

a forward ring having an outer periphery for radially positioning said retainer to said connector housing and a rear end portion connected to adjacent side end portions of said operating parts, each of said rear end portions of said support parts being located adjacent to said radial plane including the rear catching edges of said stopping parts, so that said rear end portions of said support parts serve as said positioning and fixing means.

2. The retainer according to claim 1, wherein said support parts include:

a second pair of said connecting parts, each pair of said connecting parts interconnecting said forward ring and said respective side end portions of said operating parts, each pair of said connecting parts being disposed such that one of said stopping parts is located therebetween; and a pair of walls interconnecting said connecting parts adjacent to each other for preventing relative movement of the connecting parts adjacent each other, each of said walls having respective rear edges adjacent to said radial plane including the rear catching edges of said stopping parts.

3. The retainer according to claim 1, wherein said forward ring comprises a pair of flanges defining said bore.

4. A retainer of an elastic material employed in a pipe coupling for a pipe provided with a stopping protrusion on an outer circumference thereof and a connector housing for receiving said pipe, said retainer being interposed between said pipe and said connector housing for engagement with said pipe and said connector housing, said retainer comprising:

a pair of stopping parts disposed opposite each other with respect to a diametrical direction of said retainer, each of said stopping parts having a forward catching edge for engaging said stopping protrusion of said pipe and a rearward catching edge for engaging said connector housing, each of said forward catching edges being pivotable about a pivotal axis extending in a direction perpendicular to said diametrical direction and perpendicular to an axial direction of said retainer;

a pair of operating parts connected to rear end portions of said stopping parts respectively for producing pivotal movement of said stopping parts; and means for positioning each said pivotal axis of said stopping parts to a position adjacent to a radial plane including the rearward catching edges of said stopping parts, and for fixing a distance between said pivotal axes of said stopping parts with respect to said diametrical direction of said retainer, said operation parts being displaceable toward said pipe to cause said forward catching edges of said stopping parts are kept engaged with said connector housing, each of said operating parts having side end portions opposite each other with respect to said direction of said pivotal axis of said retainer, said retainer further comprising:

a forward ring having an outer periphery for radially positioning said retainer to said connector housing and a bore through which said pipe passes; and two pairs of connecting parts, each pair of said connecting parts interconnecting said forward ring and respective side end portions of said operating parts, each pair of said connecting parts being disposed such that one of said stopping parts is located therebetween;

said positioning and fixing means comprising a pair of walls interconnecting said connecting parts adjacent to each other for preventing relative movement of the connecting parts adjacent to each other of said walls having a respective rear edge adjacent to the radial plane including the rearward catching edges of said stopping parts.

5. The retainer according to claim 4, wherein said forward ring comprises a pair of flanges defining said bore.

6. A retainer of an elastic material employed in a pipe coupling for a pipe provided with a stopping protrusion on an outer circumference thereof and a connector housing for receiving said pipe, said retainer being interposed between said pipe and said connector housing for engagement with said pipe and said connector housing, said retainer comprising:

a pair of stopping parts disposed opposite each other with respect to a diametrical direction of said retainer, each of said stopping parts having a forward catching edge for engaging said stopping protrusion of said pipe and a rearward catching edge for engaging said connector housing, each of said forward catching edges being pivotable about a pivotal axis extending in a direction perpendicular to said diametrical direction and perpendicular to an axial direction of said retainer;

a pair of operating parts connected to rear end portions of said stopping parts respectively for producing pivotal movement of said stopping parts; and means for positioning each said pivotal axis of said stopping parts to a position adjacent to a radial plane including the rearward catching edges of said stopping parts, and for fixing a distance between said pivotal axes of said stopping parts with respect to said diametrical direction of said retainer, said operation parts being displaceable toward said pipe to cause said forward catching edges of said stopping parts to be moved radially outward so as to be disengaged from said stopping protrusion of said pipe while said rearward catching edges of said stopping parts are kept engaged with said connector housing, each of said operating parts having side end portions opposite each other with respect to said direction of said pivotal axis of said retainer, said retainer further comprising:

a forward ring having an outer periphery for radially positioning said retainer to said connector housing and a bore through which said pipe passes; and two pairs of connecting parts, each pair of said connecting parts interconnecting said forward ring and said respective side end portions of said operating parts, each pair of said connecting parts being disposed such that one of said stopping parts is located therebetween;

said positioning and fixing means comprising projections disposed on said connecting parts respectively for engagement with said connector housing, said projections being disposed adjacent to said radial plane including said rear catching edges of said stopping parts.

7. The retainer according to claim 6, wherein each of said projections extends forwardly in said axial direction of said retainer from a position adjacent to said radial plane including said rearward catching edges of said stopping parts.

8. The retainer according to claim 6, wherein said forward ring comprises a pair of flanges defining said bore.

* * * * *